United States Patent [19]

Damji et al.

[11] Patent Number: 5,845,179
[45] Date of Patent: Dec. 1, 1998

[54] PIN CHARGE COROTON WITH OPTIMUM DIMENSIONS FOR MINIMUM OZONE PRODUCTION

[75] Inventors: Dhirendra C. Damji, Webster; Jerry W. Bryant, Rochester; Ajay Kumar, Fairport, all of N.Y.

[73] Assignee: Xerox Corporation, Stamford, Conn.

[21] Appl. No.: 971,073

[22] Filed: Nov. 14, 1997

[51] Int. Cl.⁶ .................................................. G03G 15/02
[52] U.S. Cl. ...................... 399/173; 250/324; 361/229; 399/171
[58] Field of Search ................................ 399/168, 170, 399/173, 171, 172; 250/324–326; 361/220, 225, 230, 229

[56] References Cited

U.S. PATENT DOCUMENTS

| | | | |
|---|---|---|---|
| 4,335,420 | 6/1982 | Mitsuo et al. | 399/171 X |
| 4,533,230 | 8/1985 | Fletcher et al. | 399/173 |
| 4,585,320 | 4/1986 | Altavela et al. | 399/170 X |
| 4,803,512 | 2/1989 | Ogura et al. | 399/170 |
| 5,051,781 | 9/1991 | Roehrs et al. | 399/60 |
| 5,216,465 | 6/1993 | Arai et al. | 399/90 |
| 5,602,712 | 2/1997 | Duifuku et al. | 361/225 |
| 5,666,605 | 9/1997 | Tokimatsu et al. | 399/173 |
| 5,774,324 | 6/1998 | Hayashi et al. | 361/225 |

Primary Examiner—S. Lee
Attorney, Agent, or Firm—John S. Wagley

[57] ABSTRACT

A charging apparatus for applying a uniform electrostatic charge to a charge retentive surface is provided. The apparatus includes a housing and an array of pin electrodes supported by the housing and positioned adjacent the surface in a non-contact relationship. The apparatus also includes a generally U shaped shield connected to the housing and at least partially surrounding the array of pin electrodes. The apparatus also includes a grid positioned across distal ends of the shield. The grid defines an effective charge length and an effective grid width. The apparatus also includes a power supply operatively coupled to the pin electrodes for supplying a predetermined current to each of the pin electrode. The power supply provides a predetermined voltage to the grid. At least one of the magnitude of the current, the magnitude of the voltage, the effective charge length, and the effective grid width being selected so as to optimize the charge uniformity, to minimize the sensitivity to photoreceptor grid sensitivity, and to minimize the ozone generated within the charging apparatus.

24 Claims, 10 Drawing Sheets

PIN CHARGE COROTON WITH OPTIMUM DIMENSIONS FOR MINIMUM OZONE PRODUCTION

Cross reference is made to the following applications field concurrently herewith: U.S. patent application Ser. No. 08/970,719 entitled "Development Bias Connector with Integral Support" by Dhirendra C. Damji et al., U.S. patent application Ser. No. 08/971,842 entitled "Charging Device Module For Use With Print Cartridge" by Ajay Kumar et al., U.S. patent application Ser. No. 08/971,098 entitled "Charging Device Having An Electrode With Integral Electrical Connector" by Ajay Kumar et al., Attorney Docket Number U.S. patent application Ser. No. 08/971,015 entitled "Charging Device Having A Shield With Integral Electrical Connector" by Ajay Kumar et al., U.S. patent application Ser. No. 08/970,322 entitled "Process Cartridge Including Process Components Having Critical Image Quality And Life-Extending Process Path Acting Regions" by Dhirendra C. Damji et al., U.S. patent application Ser. No. 08/971,690 entitled "Variable Size, Replaceable Toner Sump Pans For Print Cartridges" by Dhirendra C. Damji et al., U.S. patent application Ser. No. 08/970,313 entitled "Molded Quick Change Photoreceptor Support" by Ajay Kumar et al., U.S. patent application Ser. No. 08/971,010 entitled "Printing Cartridge With Planar Drive Train" by Ajay Kumar et al., U.S. patent application Ser. No. 08/970,839 entitled "Process Cartridge Including A Handle Defining Part Of A Machine Paper Path" by Dhirendra C. Damji et al., U.S. patent application Ser. No. 08/970,321 entitled "Electrostatographic Process Cartridge Having A Non-Metallic Photoreceptor Grounding Pin" by Daniel A. Chiesa et al., U.S. patent application Ser. No. 08/970,318 entitled "Limited Life Electrostatographic Process Cartridge Having A Waste Toner Electro-Sump Subassembly" by Daniel A. Chiesa et al., U.S. patent application Ser. No. 08/970,354 entitled "Process Cartridge Having A Drive Assembly Resultant Force Counter-Acting Member" by Dhirendra C. Damji et al., U.S. patent application Ser. No. 08/970,320 entitled "Process Cartridge Including A Banding Defect Preventing Waste Toner Moving Auger" by Dhirendra C. Damji et al., U.S. patent application Ser. No. 08/971,323 entitled "Process Cartridge Including A Developer Housing Defining Part Of A Machine Paper Path" by Dhirendra C. Damji et al., U.S. patent application Ser. No. 08/970,847 entitled "All-In-One Process Cartridge Including A Photoreceptor And Process Components Having Relative Critical, Image Quality Acting Regions" by Dhirendra C. Damji et al., U.S. patent application Ser. No. 08/971,691 entitled "Printing Cartridge With Molded Cantilever Developer Roller Spacing Spring" by Ajay Kumar et al., and U.S. patent application Ser. No. 08/970,319 entitled "User Interface For An Electrostatographic Reproduction Machine" by Mark L. Leveto.

BACKGROUND

This invention relates to electrostatographic reproduction machines, and more particularly to an economical and capacity-extendible all-in-one process cartridge for easy adaptive use in a family of compact electrostatographic reproduction machines having different volume capacities and consumable life cycles. Specifically this invention relates to such a cartridge including a pin charge corotron with optimum dimensions for minimum ozone production.

Generally, the process of electrostatographic reproduction, as practiced in electrostatographic reproduction machines, includes charging a photoconductive member to a substantially uniform potential so as to sensitize the surface thereof. A charged portion of the photoconductive surface is exposed at an exposure station to a light image of an original document to be reproduced. Typically, an original document to be reproduced is placed in registration, either manually or by means of an automatic document handler, on a platen for such exposure.

Exposing an image of an original document as such at the exposure station, records an electrostatic latent image of the original image onto the photoconductive member. The recorded latent image is subsequently developed using a development apparatus by bringing a charged dry or liquid developer material into contact with the latent image. Two component and single component developer materials are commonly used. A typical two-component dry developer material has magnetic carrier granules with fusible toner particles adhering triobelectrically thereto. A single component dry developer material typically comprising toner particles only can also be used. The toner image formed by such development is subsequently transferred at a transfer station onto a copy sheet fed to such transfer station, and on which the toner particles image is then heated and permanently fused so as to form a "hardcopy" of the original image.

It is well known to provide a number of the elements and components, of an electrostatographic reproduction machine, in the form of a customer or user replaceable unit (CRU). Typically such units are each formed as a cartridge that can be inserted or removed from the machine frame by a customer or user. Reproduction machines such as copiers and printers ordinarily include consumable materials such as toner, volume limiting components such as a waste toner container, and life cycle limiting components such as a photoreceptor and a cleaning device. Because these elements of the copying machine or printer must be replaced frequently, they are more likely to be incorporated into a replaceable cartridge as above.

There are therefore various types and sizes of cartridges, varying from single machine element cartridges such as a toner cartridge, to all-in-one electrostatographic toner image forming and transfer process cartridges. The design, particularly of an all-in-one cartridge can be very costly and complicated by a need to optimize the life cycles of different elements, as well as to integrate all the included elements, while not undermining the image quality. This is particularly true for all-in-one process cartridges to be used in a family of compact electrostatographic reproduction machines having different volume capacities and elements having different life cycles.

There is therefore a need for a quality image producing, economical and capacity-extendible all-in-one process cartridge that is easily adapted for use in various machines in a family of compact electrostatographic reproduction machines having different volume capacities and elements with different life cycles.

The charging of the photoconductive surface is used to prepare the surface for the exposure step so that a latent image may be formed on the photocondutive surface. The latent image is developed with marking particles and transferred to a substrate to form the copy. Charging of the surface is typically accomplished through an electrical device which generates ions which charge the surface. The formation of ions by the charging device often generates ozone as well as other undesirable emissions which are controlled.

To minimize the ozone irradiating from a printing machine, printing machines frequently include ozone filters which add cost to the printing machine. Furthermore, ozone problems may cause power fluctuations within the printing machine. Further, the generation of ozone may cause electrical noise to occur within the printing machine. Further, the generation of ozone may cause the charging process to become more unstable. Further, the generation of ions through the charging process requires a large power consumption.

The following disclosures may be relevant to various aspects of the present invention:

U.S. Pat. No. 4,533,230
Patentee: Fletcher, et al.
Issue Date: Aug. 6, 1985
U.S. Pat. No. 4,585,320
Patentee: Altavela, et al.
Issue Date: Apr. 29, 1986
U.S. Pat. No. 4,803,512
Patentee: Ogura, et al.
Issue Date: Feb. 7, 1989
U.S. Pat. No. 5,051,781
Patentee: Roehrs, et al.
Issue Date: Sep. 24, 1991
U.S. Pat. No. 5,216,465
Patentee: Arai, et al.
Issue Date: Jun. 1, 1993
U.S. Pat. No. 5,602,712
Patentee: Daifuku, et al.
Issue Date: Feb. 11, 1997
U.S. Pat. No. 5,666,605
Patentee: Tokimatsu, et al.
Issue Date: Sep. 9, 1997

U.S. Pat. No. 4,533,230 discloses a discharge apparatus for use in applying a charge to a charge retentive surface. The apparatus has an array of pin electrodes for charging the surface. The operation at higher current densities for shorter intervals achieves stable output at lower current levels.

U.S. Pat. No. 4,585,320 discloses a corona generating device for depositing charge. The device includes at least one elongated electrode and one element capable of adsorbing nitrogen oxide species generated. The element is plated with a thin layer of lead. The electrode includes a thin wire coated with a dielectric material. The device includes a shield plated with lead.

U.S. Pat. No. 4,803,512 discloses an image forming cartridge including a charger unit. Wire positioning members are provided at positions corresponding to holes in the charger unit. The members are spaced to ensure uniform charging.

U.S. Pat. No. 5,051,781 discloses an automatic xerographic set up and monitoring process for an electrostatographic machine with a corona charge intercept value obtained and used to optimally set corona charging levels for different modes.

U.S. Pat. No. 5,216,465 discloses a print cartridge including a primary static charger. The primary static charger has a grid which is contacted by a leaf spring to bias the charger toward the housing.

U.S. Pat. No. 5,602,712 discloses a photoconductive drum which is charged by placing a contact charger member in abutment with the object and applying a voltage. The charging is effected by properly controlling the capacitance of the charger member, the capacitance of the object and the applied voltage. A potential is achieved at low voltage while preventing ozone generation.

U.S. Pat. No. 5,666,605 discloses a corona discharging type charging device including saw tooth shaped electrodes. Side plates are placed on both sides of the electrodes and a control grid is applied with a DC voltage.

SUMMARY OF THE INVENTION

In accordance with one aspect of the present invention, there is provided a charging apparatus for applying a uniform electrostatic charge to a charge retentive surface. The apparatus includes a housing and an array of pin electrodes supported by the housing and positioned adjacent the surface in a non-contact relationship. The apparatus also includes a generally U shaped shield connected to the housing and at least partially surrounding the array of pin electrodes. The apparatus also includes a grid positioned across distal ends of the shield. The grid defines an effective charge length and an effective grid width. The apparatus also includes a power supply operatively coupled to the pin electrodes for supplying a predetermined current to each of the pin electrode. The power supply provides a predetermined voltage to the grid. At least one of the magnitude of the current, the magnitude of the voltage, the effective charge length, and the effective grid width being selected so as to optimize the charge uniformity, to minimize the sensitivity to photoreceptor grid sensitivity, and to minimize the ozone generated within the charging apparatus.

In accordance with another aspect of the present invention, there is provided a process cartridge for use in a printing machine is provided. The process cartridge includes a charging apparatus for applying a uniform electrostatic charge to a charge retentive surface. The apparatus includes a housing and an array of pin electrodes supported by the housing and positioned adjacent the surface in a non-contact relationship a generally U shaped shield connected to said housing and at least partially surrounding the array of pin electrodes. The apparatus also includes a grid positioned across distal ends of the shield. The grid defines an effective charge length and an effective grid width. The apparatus also includes a power supply operatively coupled to the pin electrodes for supplying a predetermined current to each of the pin electrode. The power supply provides a predetermined voltage to the grid. At least one of the magnitude of the current, the magnitude of the voltage, the effective charge length, and the effective grid width are selected so as to optimize the charge uniformity, to minimize the sensitivity to photoreceptor grid sensitivity, and to minimize the ozone generated within the charging apparatus.

In accordance with yet another aspect of the present invention, there is provided an electrophotographic printing machine for applying developer material onto a latent image to form a developed image of the type including a process cartridge. The process cartridge includes a charging apparatus for applying a uniform electrostatic charge to a charge retentive surface. The apparatus includes a housing and an array of pin electrodes supported by the housing and positioned adjacent the surface in a noncontact relationship a generally U shaped shield connected to said housing and at least partially surrounding the array of pin electrodes. The apparatus also includes a grid positioned across distal ends of the shield. The grid defines an effective charge length and an effective grid width. The apparatus also includes a power supply operatively coupled to the pin electrodes for supplying a predetermined current to each of the pin electrode. The power supply provides a predetermined voltage to the grid. At least one of the magnitude of the current, the magnitude of the voltage, the effective charge length, and the effective grid width are selected so as to optimize the charge uniformity, to minimize the sensitivity to photoreceptor grid sensitivity, and to minimize the ozone generated within the charging apparatus.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
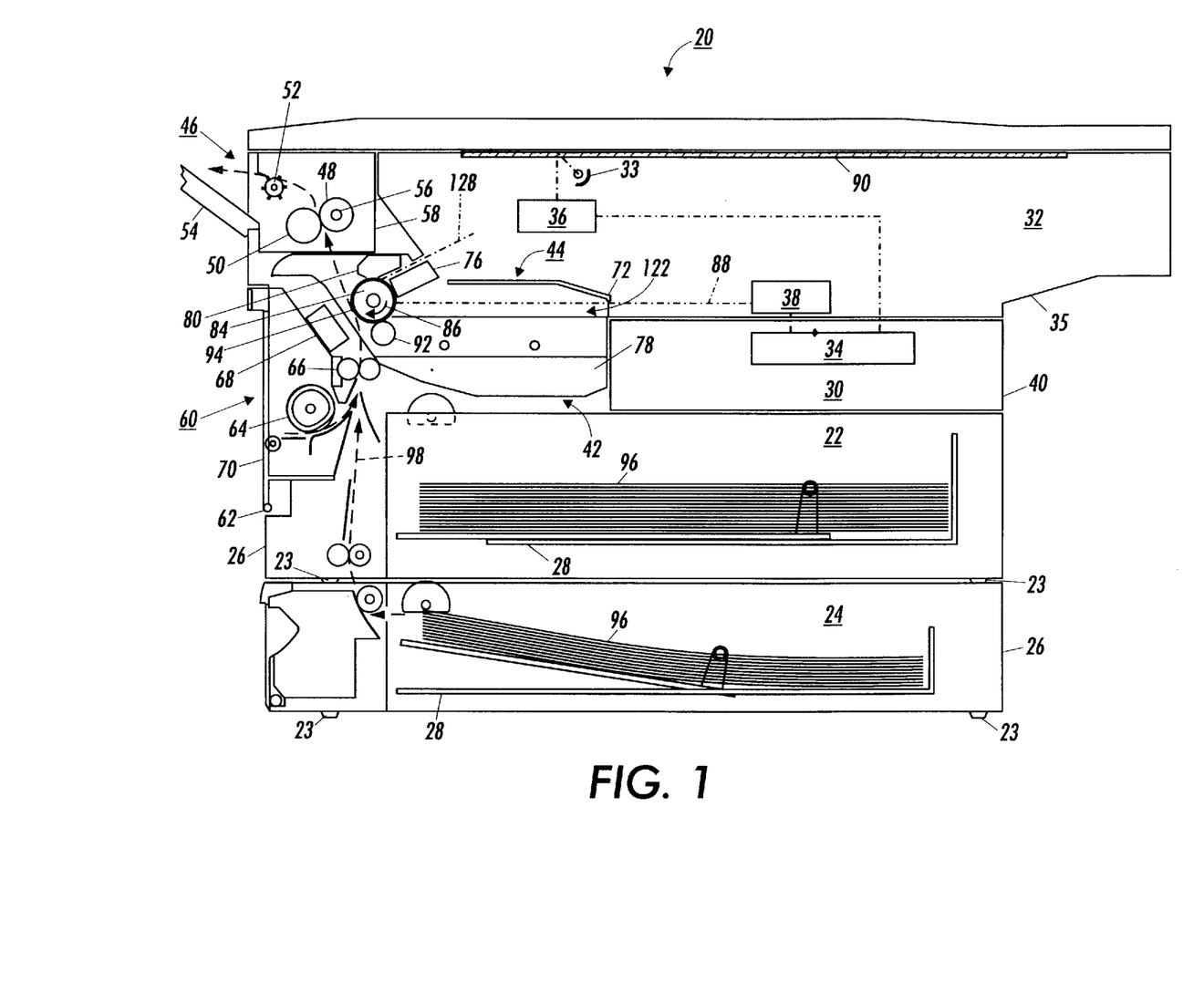
FIG. 1 is a front vertical illustration of an exemplary compact electrostatographic reproduction machine comprising separately framed mutually aligning modules in accordance with the present invention.
Figure 9:
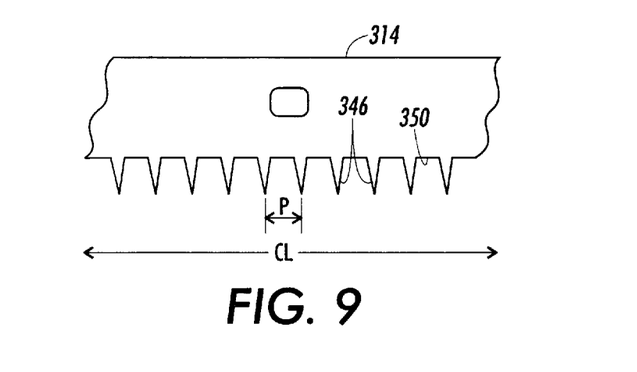
FIG. 9 is a partial plan view of the pin electrode of FIG. 7.

Referring now to FIG. 1 and 9, there is illustrated a frameless exemplary compact electrostatographic reproduction machine 20 comprising separately framed mutually aligning modules according to the present invention. The compact machine 20 is frameless, meaning that it does not have a separate machine frame to which electrostatographic process subsystems are assembled, aligned to the frame, and then aligned relative to one another as is typically the case in conventional machines. Instead, the architecture of the compact machine 20 is comprised of a number of individually framed, and mutually aligning machine modules that variously include pre-aligned electrostatographic active process subsystems.

As shown, the frameless machine 20 comprises at least a framed copy sheet input module (CIM) 22. Preferably, the machine 20 comprises a pair of copy sheet input modules, a main or primary module the CIM 22, and an auxiliary module the (ACIM) 24, each of which has a set of legs 23 that can support the machine 20 on a surface, therefore suitably enabling each CIM 22, 24 to form a base of the machine 20. As also shown, each copy sheet input module (CIM, ACIM) includes a module frame 26 and a copy sheet stacking and lifting cassette tray assembly 28 that is slidably movable in and out relative to the module frame 26. When as preferred here, the machine 20 includes two copy sheet input modules, the very base module is considered the auxiliary module (the ACIM), and the top module which mounts and mutually aligns against the base module is considered the primary module (the CIM).

The machine 20 next comprises a framed electronic control and power supply (ECS/PS) module 30, that as shown mounts onto, and is mutually aligned against the CIM 22 (which preferably is the top or only copy sheet input module). A framed latent image forming imager module 32 then mounts over and is mutually aligned against the ECS/PS module. The ECS/PS module 30 includes all controls and power supplies (not shown) for all the modules and processes of the machine 20. It also includes an image processing pipeline unit (IPP) 34 for managing and processing raw digitized images from a Raster Input Scanner (RIS) 36, and generating processed digitized images for a Raster Output Scanner (ROS) 38. The ECS/PS module 30 also includes harnessless interconnect boards and inter-module connectors (not shown), that provide all power and logic paths to the rest of the machine modules. An interconnect board (PWB) (not shown) connects the ECS controller and power supply boards (not shown) to the inter-module connectors, as well as locates all of the connectors to the other modules in such a manner that their mating connectors would automatically plug into the ECS/PS module during the final assembly of the machine 20. Importantly, the ECS/PS module 30 includes a module frame 40 to which the active components of the module as above are mounted, and which forms a covered portion of the machine 20, as well as locates, mutually aligns, and mounts to adjacent framed modules, such as the CIM 22 and the imager module 32.

The framed copy sheet input modules 22, 24, the ECS/PS module 30, and the imager module 32, as mounted above, define a cavity 42. The machine 20 importantly includes a customer replaceable, all-in-one CRU or process cartridge module 44 that is insertably and removably mounted within the cavity 42, and in which it is mutually aligned with, and operatively connected to, the framed CIM, ECS/PS and imager modules 22, 30, 32.

As further shown, the machine 20 includes a framed fuser module 46, that is mounted above the process cartridge module 44, as well as adjacent an end of the imager module 32. The fuser module 46 comprises a pair of fuser rolls 48, 50, and at least an exit roll 52 for moving an image carrying sheet through, and out of, the fuser module 46 into an output or exit tray 54. The fuser module also includes a heater lamp 56, temperature sensing means (not shown), paper path handling baffles(not shown), and a module frame 58 to which the active components of the module, as above, are mounted, and which forms a covered portion of the machine 20, as well as locates, mutually aligns, and mounts to adjacent framed modules, such as the imager module 32 and the process cartridge module 44.

The machine then includes an active component framed door module 60 that is mounted pivotably at pivot point 62 to an end of the CIM 22. The door module 60 as mounted, is pivotable from a substantially closed vertical position into an open near-horizontal position in order to provide access to the process cartridge module 44, as well as for jam clearance of jammed sheets being fed from the CIM 22. The door module 60 comprises active components including a bypass feeder assembly 64, sheet registration rolls 66, toner image transfer and detack devices 68, and the fused image output or exit tray 54. The door module 60 also includes drive coupling components and electrical connectors (not shown), and importantly, a module frame 70 to which the active components of the module as above are mounted, and which forms a covered portion of the machine 20, as well as, locates, mutually aligns, and mounts to adjacent framed modules, such as the CIM 22, the process cartridge module 44, and the fuser module 46.

More specifically, the machine 20 is a desktop digital copier, and each of the modules 22, 24, 30, 32, 44, 48, 60, is a high level assembly comprising a self-containing frame and active electrostatographic process components specified for sourcing, and enabled as a complete and shippable product. It is believed that some existing digital and light lens reproduction machines may contain selective electrostatographic modules that are partitioned for mounting to a machine frame, and in such a manner that they could be designed and manufactured by a supplier. However, there are no known such machines that have no separate machine frame but are comprised of framed modules that are each designed and supplied as self-standing, specable (i.e. separately specified with interface inputs and outputs), testable, and shippable module units, and that are specifically crafted and partitioned for enabling all of the critical electrostatographic functions upon a simple assembly. A unique advantage of the machine 20 of the present invention as such is that its self-standing, specable, testable, and shippable module units specifically allow for high level sourcing to a small set of module-specific skilled production suppliers. Such high level sourcing greatly optimizes the quality, the total cost, and the time of delivering of the final product, the machine 20.

Referring now to FIGS. 1–6, the CRU or process cartridge module 44 generally comprises a module housing subassembly 72, a photoreceptor subassembly 74, a charging subassembly 76, a developer subassembly 78 including a source of fresh developer material, a cleaning subassembly 80 for removing residual toner as waste toner from a surface of the photoreceptor, and a waste toner sump subassembly 82 for storing waste toner. The module housing subassembly 72 of the CRU or process cartridge module 44 importantly provides and includes supporting, locating and aligning structures, as well as driving components for the process cartridge module 44.

Still referring to FIG. 1, operation of an imaging cycle of the machine 20 using the all-in-one process cartridge module 44 generally, can be briefly described as follows. Initially, a photoreceptor in the form of a photoconductive drum 84 of the customer replaceable unit (CRU) or process cartridge module 44, rotating in the direction of the arrow 86, is charged by the charging subassembly 76. The charged portion of the drum is then transported to an imaging/exposing light 88 from the ROS 38 which forms a latent image on the drum 84, corresponding to an image of a document positioned on a platen 90, via the imager module 32. It will also be understood that the imager module 32 can easily be changed from a digital scanning module to a light lens imaging module.

The portion of the drum 84 bearing a latent image is then rotated to the developer subassembly 78 where the latent image is developed with developer material such as with charged single component magnetic toner using a magnetic developer roller 92 of the process cartridge module 44. The developed image on the drum 84 is then rotated to a near vertical transfer point 94 where the toner image is transferred to a copy sheet substrate 96 fed from the CIM 22 or ACIM 22 along a copy sheet or substrate path 98. In this case, the detack device 68 of the door module 60 is provided for charging the back of the copy sheet substrate (not shown) at the transfer point 94, in order to attract the charged toner image from the photoconductive drum 84 onto the copy sheet substrate.

The copy sheet substrate with the transferred toner image thereon, is then directed to the fuser module 46, where the heated fuser roll 48 and pressure roll 50 rotatably cooperate to heat, fuse and fix the toner image onto the copy sheet substrate. The copy sheet substrate then, as is well known, may be selectively transported to the output tray 54 or to another post-fusing operation.

The portion of the drum 84 from which the developed toner image was transferred is then advanced to the cleaning subassembly 80 where residual toner and residual charge on the drum 84 are removed therefrom. The imaging cycle of the machine 20 using the drum 84 can then be repeated for forming and transferring another toner image as the cleaned portion again comes under the charging subassembly 76.

The detailed and specific advantageous aspects of the structure and operation of the all-in-one CRU or process cartridge module 44, will now be described with particular reference to FIGS. 1 to 6. As shown, the all-in-one CRU or process cartridge module 44, generally includes six subassemblies comprising the module housing subassembly 72 (FIG. 2); the cleaning subassembly 80; the photoreceptor subassembly 74; the charging subassembly 76; the developer subassembly 78 (FIG. 3); and the waste toner sump subassembly 82. Generally, the function of the all-in-one CRU or process cartridge module 44 in the machine 20 is to electrostatically form a latent image, develop such latent image into a toner image through toner development, and transfer the toner image unfused onto a printing medium, such as a sheet of paper. The CRU or process cartridge module is left-side accessible to an operator facing the CIM 22 by opening the door module 60 (FIG. 1). Once the door module is opened, an operator or customer can remove or insert the CRU or process cartridge module 44 with one hand.

Figure 2:
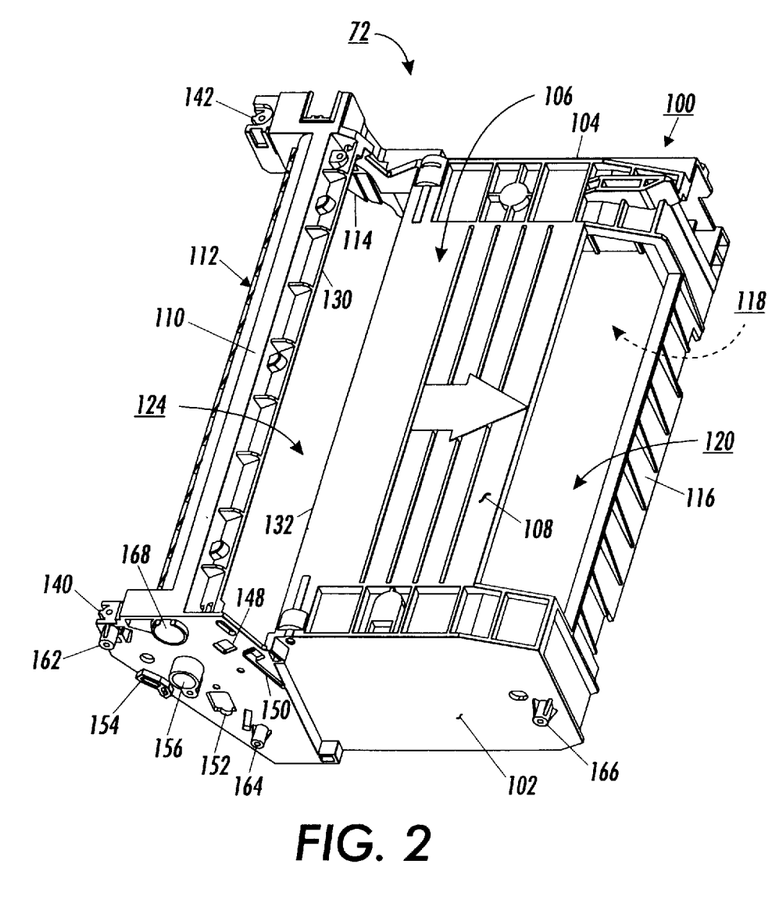
FIG. 2 is a top perspective view of the module housing of the CRU or process cartridge module of the machine of FIG. 1.
Figure 3:
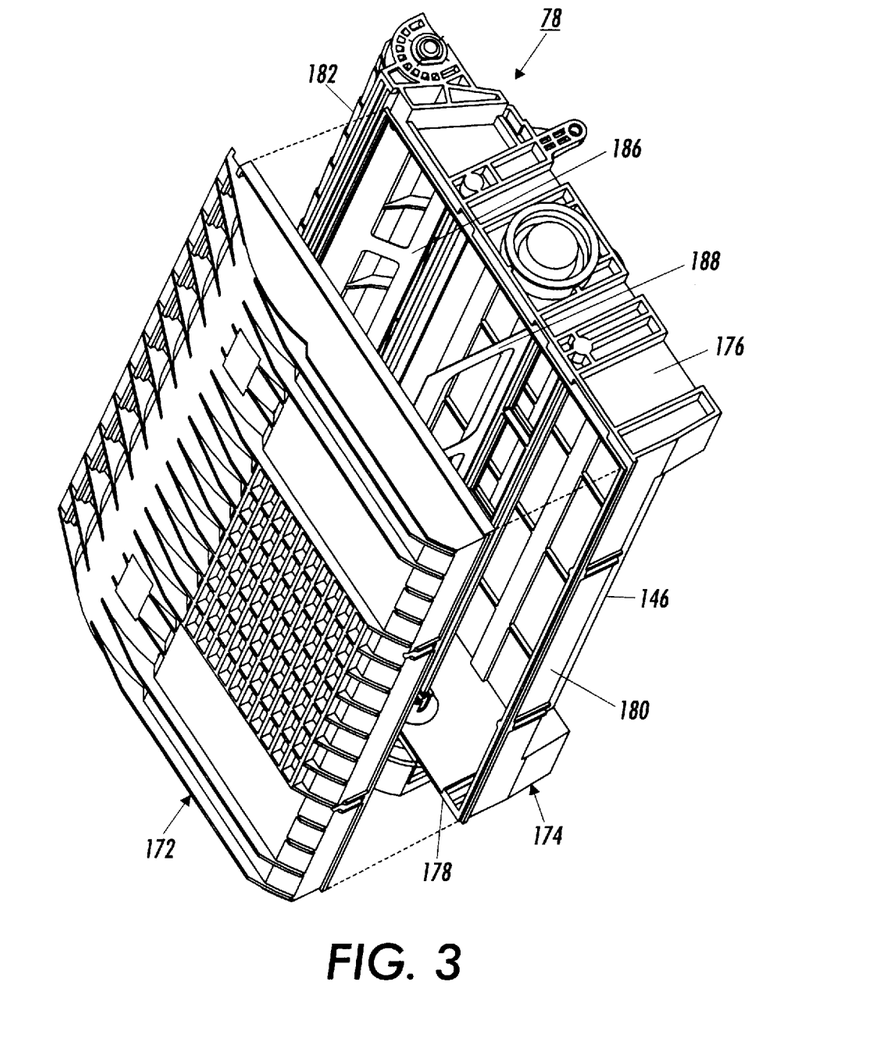
FIG. 3 is a bottom perspective view of the developer subassembly of the CRU or process cartridge module of the machine of FIG. 1 with the bottom of the developer housing unattached.

Referring now to FIGS. 1–6, the module housing subassembly 72 is illustrated (FIG. 2). As shown, it comprises a generally rectangular and inverted trough shaped module housing 100 having a first side wall 102, a second and opposite side wall 104, a top wall 106 including a substantially horizontal portion 108 and a nearly vertical portion 110 defining a raised rear end 112 (rear as considered relative to the process cartridge 44 being inserted into the cavity 42). There is no rear wall, thus resulting in an open rear end 114 for mounting the photoreceptor subassembly 74. The trough shaped module housing also includes a front end wall 116 that connects at an angle to the top wall 106. The trough shaped module housing 100 of course, has no bottom wall, and hence as inverted, it defines a trough region 118 that is wide open for assembling the developer subassembly 78 (FIG. 3). The top wall 106 and the front end wall 116 each include a first cutout 120 formed through their adjoining corner for partially defining a first light path 122 (FIG. 1) for the exposure light 88 from the ROS 38 of the imager module 32. The top wall 106 also includes a second cutout 124 formed thereinto at the adjoining angle between the horizontal 108 and near vertical 110 portions thereof for mounting the charging subassembly 76 (FIG. 5), and for partially defining a second light path 126 (FIGS. 1 and 6) for an erase light 128 being focused into the photoreceptor area at the raised rear end 112 of the module housing 100.

Importantly, the module housing 100 includes two top wall cross-sectional surfaces 130, 132 defining the second cutout 124, and one 130, of these cross-sectional wall surfaces, has a desired angle 134 (relative to the photoreceptor surface) for mounting and setting a cleaning blade 138 (FIG. 6) of the cleaning subassembly 80. Attachment members 140, 142 are provided at the raised rear end 112 and extending from the first and second side walls 102, 104 respectively, for attaching a module handle 144 to the module housing 100.

As pointed out above, the module housing 100 is the main structure of the all-in-one CRU or process cartridge module 44, and importantly supports all other subassemblies (cleaning subassembly 80, charging subassembly 76, developer subassembly 78, and sump subassembly 82) of the all-in-one process cartridge module 44. As such, it is designed for withstanding stresses due to various dynamic forces of the subassemblies, for example, for providing a required re-action force to the developer subassembly 78. Because it is located just about 3 mm below the fuser module 46, it is therefore made of a plastic material suitable for withstanding relatively high heat generated from the fuser module. Mounts (not shown) to the developer subassembly within the trough portion of the module housing subassembly are located such that the top wall 106 of the module housing defines a desired spacing comprising the first light path 122 between it and the top 146 of the developer subassembly. Similarly, the raised rear end 112 of the top wall 106 of the module housing is also such as to define a desired spacing between the charging subassembly 76 and the photoreceptor or drum 84, when both are mounted to the raised rear end 112 of the module housing 100. Additionally, the module housing 100 provides rigidity and support to the entire process cartridge module 44, and upon assembly mutually self-aligns the CRU or process cartridge module 44 relative to abutting modules such as the CIM 22, and ECS/PS module 30.

Figure 5:
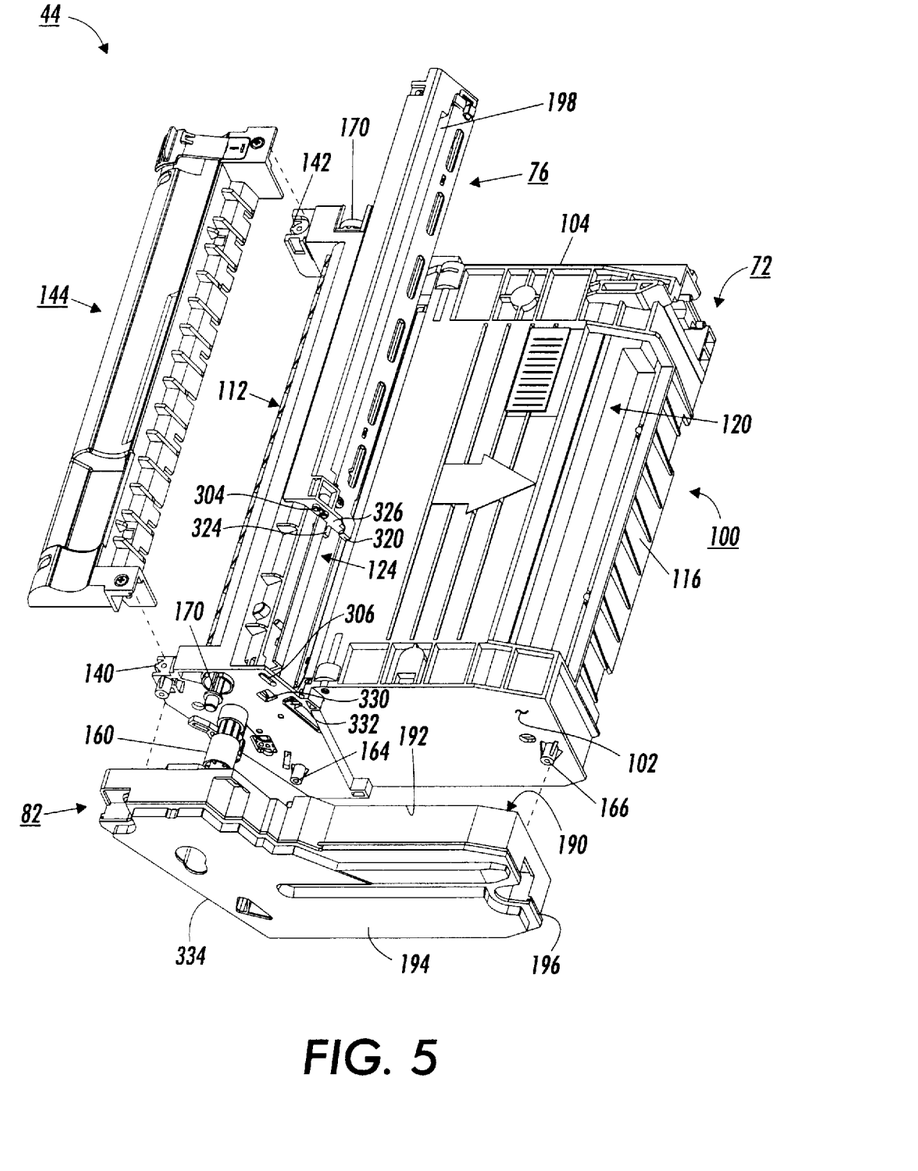
FIG. 5 is an exploded view of the various subassemblies of the CRU or process cartridge module of the machine of FIG. 1.

Referring in particular to FIG. 2, the first side wall 102 includes electrical connectors 148, 150 for supplying power from the ECS/PS module 30 (FIG. 1) via the sump subassembly 82 to the charging subassembly 76. It also includes an electrical connector 152 for supplying an electrical bias to the developer subassembly 78, as well as an alignment member 154 for aligning the detack device 68 (FIG. 1) to the photoreceptor. As also shown, the first side wall 102 further includes an apertured retainer device 156 for receiving an electrical grounding pin 160 for the photoreceptor 84. Importantly, the first side wall 102 further includes mounting members 162, 164, 166 for mounting the sump subassembly 82 to the module housing 100, and an opening for mounting an auger 170 of the cleaning subassembly 80 (FIGS. 1 and 5). The opening 168 also passes waste toner received from the photoreceptor 84 in the raised rear end 112, into the sump assembly 82, when mounted as above.

Referring now to FIG. 3, the developer subassembly 78 of the process cartridge module 44 is illustrated with an expandable bottom member 172 unattached in order to reveal the inside of the developer subassembly. As shown, the developer subassembly 78 comprises a generally rectangular developer housing 174 having the bottom member 172, the top 146, a first side 176, a second and opposite side 178, a front end 180 (relative to cartridge insertion), and a rear end 182. The developer housing 174 is for containing developer material, such as, single component magnetic toner (not shown), and it additionally houses the magnetic developer roll 92 (FIG. 1), a development bias application device 184, and a pair of developer material or toner agitators 186, 188.

Figure 4:
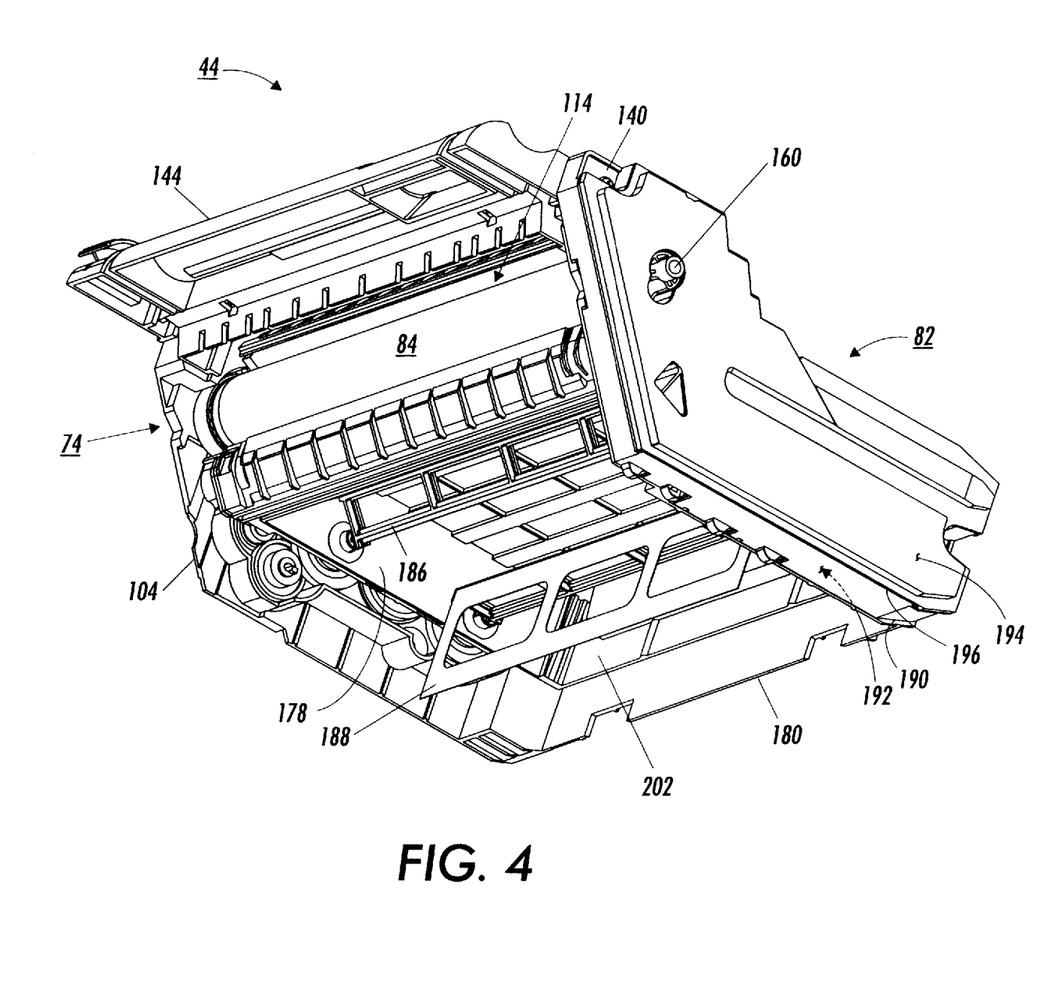
FIG. 4 is an open bottom perspective view of the CRU or process cartridge module of the machine of FIG. 1.

As shown in FIG. 4, the developer subassembly 78 is mounted to the module housing 100, and inside the trough region 118. With the bottom member 172 of the developer housing removed (for illustration purposes only), the agitators 186, 188 can clearly be seen. Also shown in FIG. 4 are the photoreceptor or drum 84 mounted within the raised rear end 112 of the module housing 100, as well as, the module handle 144 attached to the side walls 102, 104 at the raised rear end 112. The whole sump subassembly 82 is further shown with an outside surface 190 of its inside wall 192, mounted to the first side wall 102 of the module housing 100. The outside surface 194 of the outside wall 196 of the sump assembly is also clearly visible. The inside wall 192 and outside wall 196 partially define the sump cavity (not shown) for containing received waste toner, as above.

Referring now to FIG. 5, there is presented an exploded perspective view of the various subassemblies, as above, of the CRU or process cartridge module 44. As shown, the module handle 144 is attachable to mounting members 140, 142 at the raised rear end 112 of the module housing 100, and the sump subassembly 82 is mountable to the first side wall 102 of the cartridge housing. The developer subassembly 78 is mounted within the trough region 118 of the module housing 100, and is partially visible through the first cutout 120. Advantageously, the developer subassembly fits into the trough region 118 such that the top 146 (FIG. 3) of the developer subassembly and the inside of the top wall 106 of the module housing define the first light path 122 for the exposure light 88 from the ROS 38 (FIG. 1). As also shown, the charging subassembly 76 is mountable, at the second cutout 124, to the module housing 100, and includes a slit 198, through the charging subassembly, that defines part of the second light path 126 for the erase light 128 to pass to the photoreceptor 84.

Figure 6:
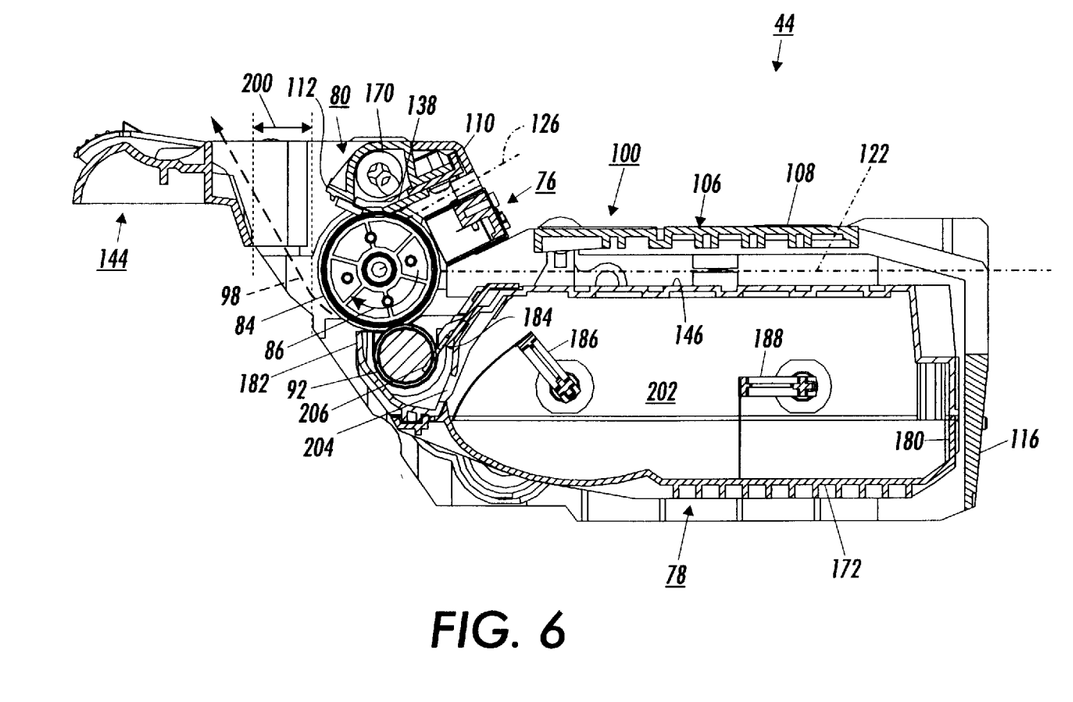
FIG. 6 is a vertical section (front-to-back) of the CRU or process cartridge module of the machine of FIG. 1.

Referring next to FIG. 6, a vertical (rear-to-back) section of the CRU or process cartridge module 44 as viewed along the plane 6—6 of FIG. 5 is illustrated. As shown, the developer subassembly 78 is mounted within the trough region 118 of the module housing subassembly 72 as defined in part by the front end wall 116, the second side wall 104, and the top wall 106 of the module housing subassembly. The module handle 144 as attached to mounting members 140, 142, (only one of which is visible), forms a portion of the sheet or paper path 98 of the machine 20 (FIG. 1) by being spaced a distance 200 from photoreceptor 84 in the raised rear end 112 of the module housing 100. The photoreceptor or drum 84 is mounted to the side walls 102, 104, (only one of which is visible), and as shown is located within the raised rear end 112 and is rotatable in the direction of the arrow 86. The charging subassembly 76 is mounted within the second cutout 124 in the top wall 106 and includes the slit 198 defining part of the second light path 126 for erase light 128 to pass to the photoreceptor 84. Upstream of the charging subassembly 76, the cleaning subassembly 80, including the cleaning blade 138 and the waste toner removing auger 170, is mounted within the raised rear end 112, and into cleaning contact with the photoreceptor 84. As further shown, the top wall 106 of the module housing 100 is spaced from the top 146 of the developer subassembly 78, thus defining the part of first light path 122 for the exposure light 88 from the ROS 38 (FIG. 1). The first light path 122 is located so as to be incident onto the photoreceptor at a point downstream of the charging subassembly 76.

The front 180, top 146, and bottom member 172 of the developer subassembly define a chamber 202, having an opening 204, for containing developer material (not shown). The first and second agitators 186, 188 are shown within the chamber 202 for mixing and moving developer material towards the opening 204. The developer material biasing device 184 and a charge trim and metering blade 206 are mounted at the opening 204. As also shown, the magnetic developer roll 92 is mounted at the opening 204 for receiving charged and metered developer material from such opening, and for transporting such developer material into a development relationship with the photoreceptor 84.

According to the present invention and referring to FIG. 5, a pin charge corotron 76 with optimum dimensions for minimum ozone production is shown installed in printing or process module 72. The corotron 76 may include various components which are assembled into the printing machine or as shown in FIG. 5 be in the form of a module. The corotron module 76 is slidably fitted into the process cartridge 72 with locators in the form of pins 304 which mate with an elongated slot 306 in the process cartridge 72. Similar location features are present in the opposite end of the corotron 76 and the process cartridge 72 to complete the engagement of the corotron onto the process cartridge 72.

Figure 7:
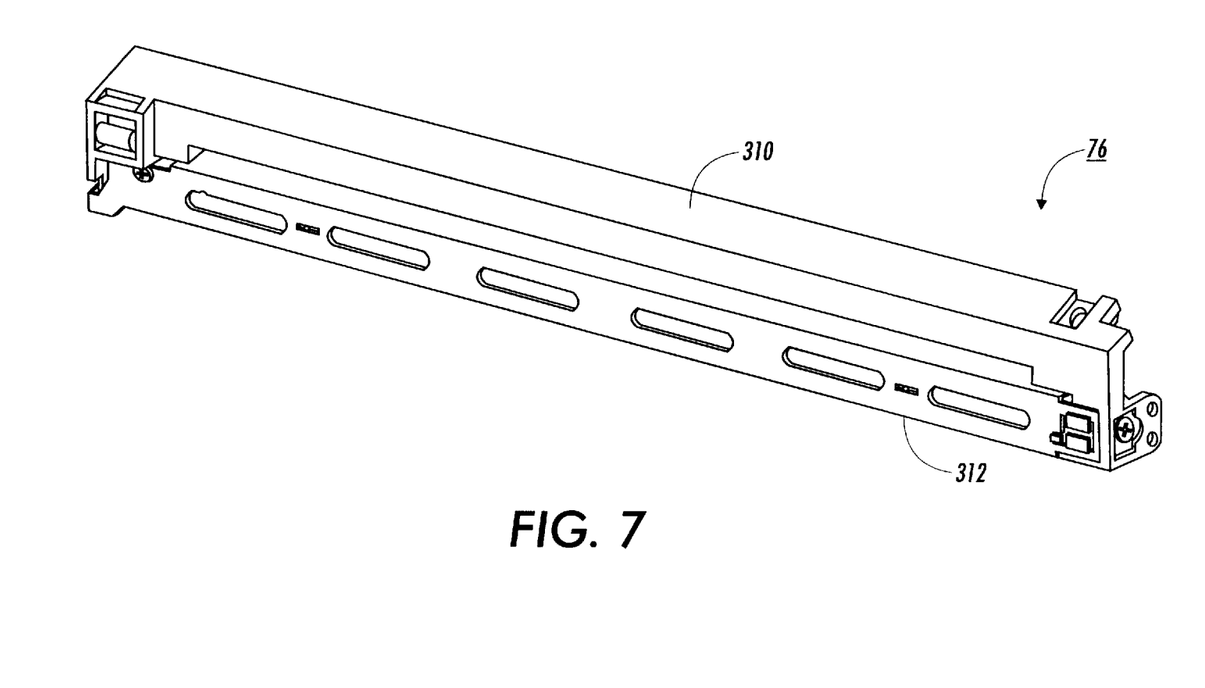
FIG. 7 is a perspective view of a pin charge corotron with optimum dimensions for minimum ozone production according to the present invention.

Referring now to FIG. 7, the corotron 76 is shown in greater detail. The corotron 76 preferably includes a housing or body 310 which may be made of any suitable durable material. Preferably the material is one which may withstand the high voltages and other elements of the charging environment. For example, the housing 310 may be made of polycarbonate with glass fillers. Other materials may include Noryl or PEP.

The corotron 76 further includes a shield 312 preferably having a U shape. The U shaped shield 312 is mounted to the housing 310. The shield 312 surrounds the electrode 314 (see FIG. 10).

Figure 10:
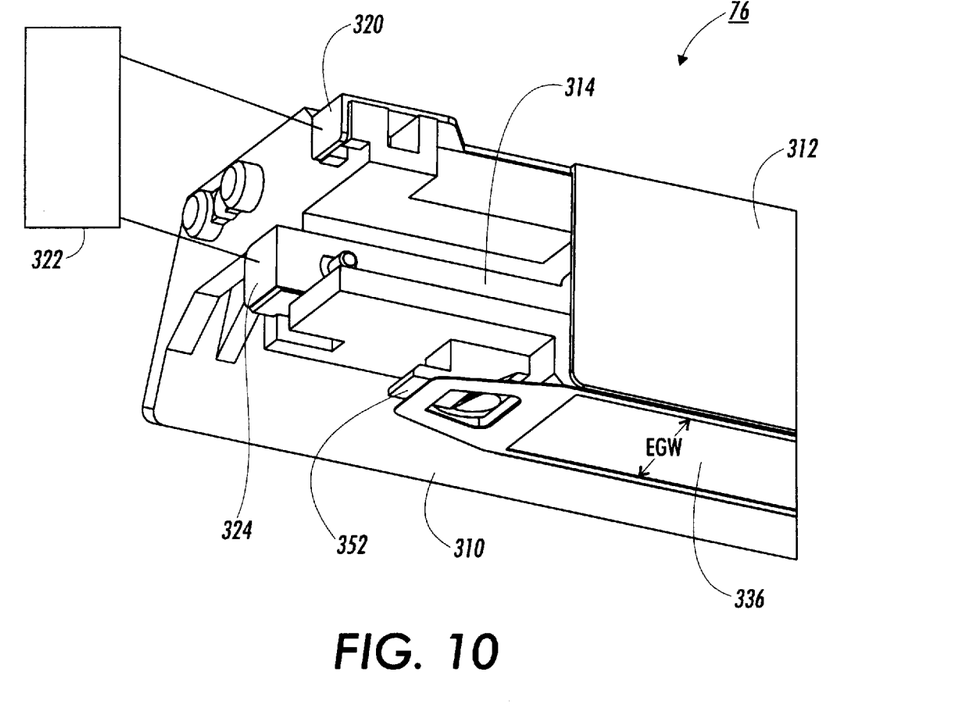
FIG. 10 is a partial perspective view of the pin charge corotron of FIG. 7.

As shown in FIG. 10, the electrode 314 is mounted to the housing 310 and is spaced from the shield 312. The shield 312 surrounds the electrode 314.

The shield 312 may be made of any suitable durable material, capable of transferring an electrical current. For example, the shield 312 may be made of stainless steel. The shield 314 includes a shield connector 320 which is operatively connected to power supply 322.

The electrode 314 is preferably in the form of a pin type electrode and may be made of any suitable durable material. Preferably, the electrode 314 is made of stainless steel. The electrode 314 includes a integrally connected electrode connector 324 which is connected to the power supply 322.

Referring again to FIG. 5, the shield connector 320 and electrode connector 324 extend beyond end face 326 of the corotron 76 and when assembled into the process cartridge 72, extend past electrode connector opening 330 and shield connector opening 332 whereby the shield connector 320 and the electrode connector 324 may contact leads in the waste toner sump. The leads in the waste toner sump 334 are electrically connected to the power supply 322 (see FIG. 10).

According to the present invention, at least one of the magnitude of the current within the power supply 322, the magnitude of the voltage in the power supply 322, the effective charge length of the electrode 314, and the effective grid width of grid 336 is selected in order that the charge uniformity may be optimized. The relative size of these features are further selected to minimize the sensitivity of the photoreceptor grid and to minimize the ozone generated within the corotron 76.

The charging critical parameters previously mentioned are preferably optimized using engineering optimization techniques. One such optimization technique, Robust Design methodology has been taught by Professor Genichi Taguchi. Robust Design methodology is described in the book *Quality Engineering Using Robust Design* by Madhav S. Phadke, Prentice Hall, 1989, the relevant portion thereof incorporated herein by is reference.

The optimization of the parameters may be achieved by using a Taguchi $L_{18}$ orthogonal matrix. Noise, i.e. components A, B, and C as well as ozone and altitude should be taken into consideration. Using the results of the optimization of the L18 orthogonal matrix, the optimum dimensions may be determined.

To perform the optimization of the charging parameters, the first step may be to determine the control factors. For example, the current, voltage, grid-P/R gap, and other design factors may be used. Further, noise factors of humidity, temperature, altitude, manufacturing variations, light leaks, and erase light should be considered.

The next step in the charge optimization is to establish a nominal value for the pin current. For example, the voltage of the shield may be chosen to be a negative 510 volts, the grid-P/R gap may be set at 1.2 mm.

With these dimensions in place, an experimental plot of the pin current versus the voltage is made with varied changes of the control factors. The second step in the optimization process is to establish the operating range and the robustness using a Taguchi method. The third step in the process is to compute the charging stability using bare plate characteristics. The fourth step in the CP optimization step is to repeat the experiments in various zones around the corotron and use techniques such as ANOVA for analysis. The fifth step in the CP optimization process is to confirm the results in laboratory and production machine environments.

Figure 8:
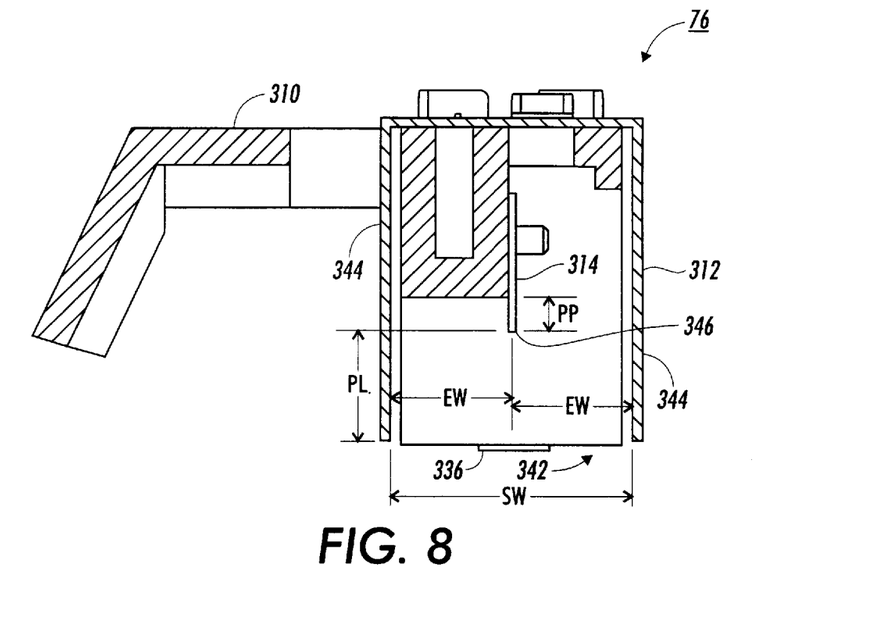
FIG. 8 is a cross sectional view of FIG. 7 along the line 8—8 in the direction of the arrows.

Utilizing these optimization techniques and referring now to FIG. 8, the charging device 76 is shown in greater detail. Open end 342 of the U shaped shield 312 may define a width SW of preferably 12 to 14 mm.

While low ozone emission is possible at low copy speeds of say, 13 copies per minute, at paper or print substrate translating speeds of 150 mm/sec, at printing speeds of 30 copies per minute, the charging of the photoconductor while maintaining low ozone emission is particularly difficult. The providing of the shield with a shield width SW of 12 mm to 14 mm, rather than the previously well used width of around 17 mm, assists greatly in reaching low ozone output with higher copy speeds.

Preferably, the electrode 314 is positioned a distance EW from the side walls 344 of the shield 312 the distance EW is preferably 6.45 inches from each wall 344.

Further, the electrode 314 includes pins 346 which extend a distance PL of preferably 5.9 mm from the open end 342 of the shield 312. Further, the pins 344 protrude a distance PP of 2 mm from the housing 310 of the corotron 76.

Referring now to FIG. 9, the electrode 314 is shown in greater detail. The electrode 314 preferably includes a quantity of 111 pins 346 which extend outwardly from edge 350 of the electrode 314. The pins 346 are spaced apart a distance P of preferably approximately 2 mm. The use of 111 pins with a pitch of 2 mm results in an effective charge length CL of 222 mm. Applicants have found that the effective charge length is preferably from 214 to 234 mm.

Referring again to FIG. 10, the grid 336 has an effective grid width EGF of 9.5 to 11.5 mm. The grid 336 extends generally the length of the electrode 314 and the shield 312. The grid 336 is supported on its distal ends by clamps 352.

Preferably, the grid 336 is in electrical contact with the shield 312 and is maintained at a similar voltage to the shield 312. The grid 336 preferably has a nominal grid voltage of approximately negative 510 volts plus or minus 15 volts.

The electrode 314 has a voltage $V_{HIGH}$ of −484 to −536 volts. The electrode 314 further has a pin array current of approximately −380 microamps, plus or minus 5%.

For proper operation of the corotron 76, the photoconductor has a discharge voltage VL of approximately minus 30 to minus 100 volts.

Figure 11:
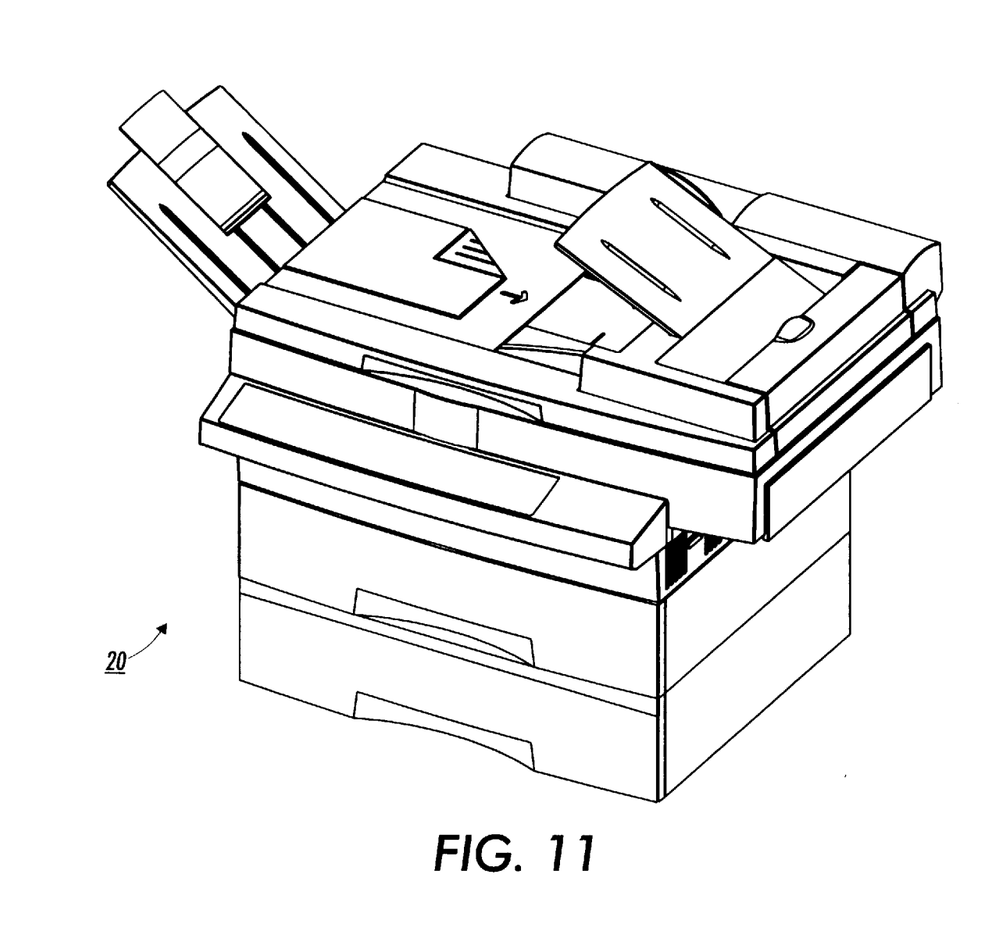
FIG. 11 is a perspective view of the machine of FIG. 1.

Referring now to FIG. 11, a printing machine 20 for use with the corotron of the present invention is shown.

By providing a pin charge corotron with optimum dimensions, a corotron may be provided which has a low ozone output of for example 0.2 parts per million.

By providing a pin charge corotron with optimum dimensions, ozone filters may not be required for the printing machine.

By providing a pin charge corotron with optimum dimensions, a printing machine may be provided that is more tolerant of power fluctuations.

By providing a pin charge corotron with optimum dimensions, a corotron and printing machine may be provided that is more tolerant of electrical noise.

By providing a pin charge corotron with optimum dimensions, a more stable charging device may be provided.

By providing a pin charge corotron with optimum dimensions, a corotron may be provided with low power consumption.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A charging apparatus for applying a uniform electrostatic charge to a charge retentive surface, said apparatus comprising:
   a housing;
   an array of pin electrodes supported by said housing and positioned adjacent said surface in a non-contact relationship;
   a generally U shaped shield connected to said housing and at least partially surrounding said array of pin electrodes;
   a grid positioned across distal ends of said shield, said grid defining an effective charge length and an effective grid width; and
   a power supply operatively coupled to said pin electrodes for supplying a predetermined current having a magnitude thereof to each of said pin electrode, said power supply providing a predetermined voltage having a magnitude thereof to said grid, at least one of the magnitude of said current, the magnitude of said voltage, the effective charge length and the effective grid width being selected so as to optimize charge uniformity, to minimize photoreceptor grid sensitivity, and to minimize ozone generated within said charging apparatus.

2. A charging apparatus according to claim 1, wherein said effective charge length is approximately 234 to 214 mm.

3. A charging apparatus according to claim 2, wherein said effective grid width is approximately 9.5 to 11.5 mm.

4. A charging apparatus according to claim 1, wherein said current is approximately −360 to −400 micro amperes.

5. A charging apparatus according to claim 1, wherein said voltage is approximately −480 to −540 volts.

6. A charging apparatus according to claim 1, wherein the magnitude of said current, the magnitude of said voltage, the effective charge length, and the effective grid width is selected by utilizing robust design methodology.

7. A charging apparatus according to claim 1, wherein said distal ends of said shield are separated from each other by a distance of 12 to 14 millimeters. to 14 millimeters.

8. A charging apparatus according to claim 1, wherein said housing comprises an electrically conductive plastic.

9. A process cartridge for use in a printing machine comprising, said process cartridge including a charging apparatus for applying a uniform electrostatic charge to a charge retentive surface, said apparatus comprising:
   a housing;
   an array of pin electrodes supported by said housing and positioned adjacent said surface in a non-contact relationship;
   a generally U shaped shield connected to said housing and at least partially surrounding said array of pin electrodes;
   a grid positioned across distal ends of said shield, said grid defining an effective charge length and an effective grid width; and
   a power supply operatively coupled to said pin electrodes for supplying a predetermined current having a magnitude thereof to each of said pin electrode, said power supply providing a predetermined voltage having a magnitude thereof to said grid, at least one of the magnitude of said current, the magnitude of said voltage, the effective charge length and the effective grid width being selected so as to optimize charge uniformity, to minimize photoreceptor grid sensitivity, and to minimize ozone generated within said charging apparatus.

10. A process cartridge according to claim 9, wherein said effective charge length is approximately 234 to 214 mm.

11. A process cartridge according to claim 9, wherein said effective grid width is approximately 9.5 to 11.5 mm.

12. A process cartridge according to claim 9, wherein said current is approximately −360 to −400 micro amperes.

13. A process cartridge according to claim 9, wherein said voltage is approximately −480 to −540 volts.

14. A process cartridge according to claim 9, wherein the magnitude of said current, the magnitude of said voltage, the effective charge length, and the effective grid width is selected by utilizing robust design methodology.

15. A process cartridge according to claim 9, wherein said distal ends of said shield are separated from each other by a distance of 12 to 14 millimeters.

16. A process cartridge according to claim 9, wherein said housing comprises an electrically conductive plastic.

17. An electrophotographic printing machine of the type including a process cartridge having a charging apparatus for applying a uniform electrostatic charge to a charge retentive surface, said apparatus comprising:
   a housing;
   an array of pin electrodes supported by said housing and positioned adjacent said surface in a non-contact relationship;
   a generally U shaped shield connected to said housing and at least partially surrounding said array of pin electrodes;

a grid positioned across distal ends of said shield, said grid defining an effective charge length and an effective grid width; and a power supply operatively coupled to said pin electrodes for supplying a predetermined current having a magnitude thereof to each of said pin electrode, said power supply providing a predetermined voltage having a magnitude thereof to said grid, at least one of the magnitude of said current, the magnitude of said voltage, the effective charge length and the effective grid width being selected so as to optimize charge uniformity, to minimize photoreceptor grid sensitivity, and to minimize ozone generated within said charging apparatus.

18. A printing machine according to claim 17, wherein said effective charge length is approximately 234 to 214 mm.

19. A printing machine according to claim 18, wherein said effective grid width is approximately 9.5 to 11.5 mm.

20. A printing machine according to claim 17, wherein said current is approximately −360 to −400 micro amperes.

21. A printing machine according to claim 17, wherein said voltage is approximately −480 to −540 volts.

22. A printing machine according to claim 17, wherein the magnitude of said current, the magnitude of said voltage, the effective charge length, and the effective grid width is selected by utilizing robust design methodology.

23. A printing machine according to claim 17, wherein said distal ends of said shield are separated from each other by a distance of 12 to 14 millimeters.

24. A printing machine according to claim 17, wherein said housing comprises an electrically conductive plastic.

* * * * *